A. Rank,
Mower.

No. 96351. Patented Nov. 2, 1869.

Witnesses,
Joe Hupton
Battis De Long

Amos Rank
by his Atty.
Wm D. Baldwin

UNITED STATES PATENT OFFICE.

AMOS RANK, OF SALEM, OHIO.

HARVESTER.

Specification forming part of Letters Patent No. 96,351, dated November 2, 1869.

*To all whom it may concern:*

Be it known that I, AMOS RANK, of Salem, in the county of Columbiana and State of Ohio, have invented a new and useful Improvement in Harvesters, of which the following is a full, clear, and exact description.

The object of my invention is to vary the speed of the cutters, to adapt the machine either to reaping or mowing; and the improvement consists, first, of the combination, with the driving-gearing of a harvester, of a wheel capable of being reversed on its shaft, and having external teeth on one face and internal teeth on the other, the internal and external gears being of unequal diameters, but alternately gearing with the same shaft when reversed, whereby the speed of the cutters is varied merely by reversing the gear-wheel.

Second, the improvement further consists of the combination, with a reversible wheel having external and internal spur-gears on its opposite faces and mounted on a counter-shaft, with a spur-pinion mounted on a crank-shaft parallel with the counter-shaft, and so arranged as to mesh with either gear on the reversible wheel.

Figure 2:
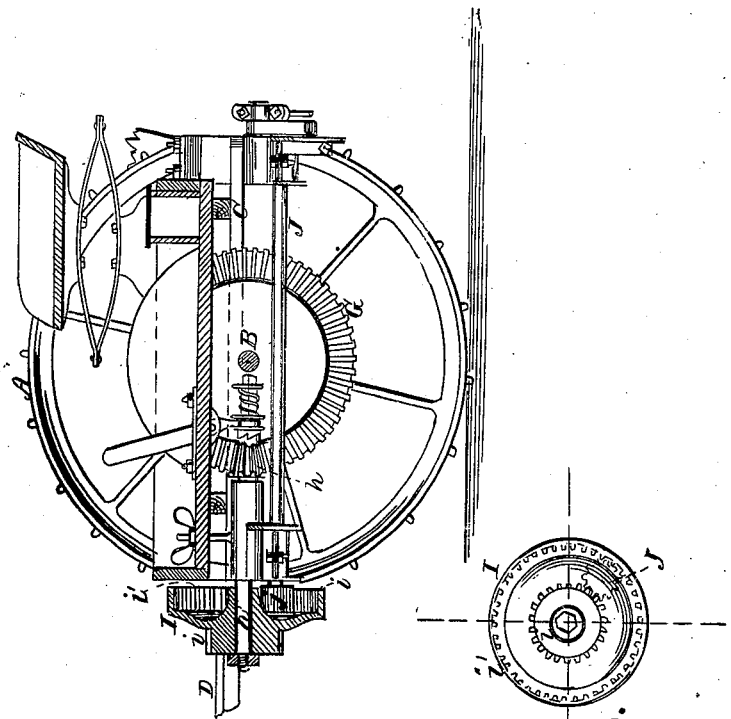
Figure 3:
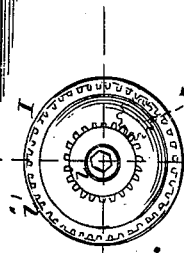
Figure 1:
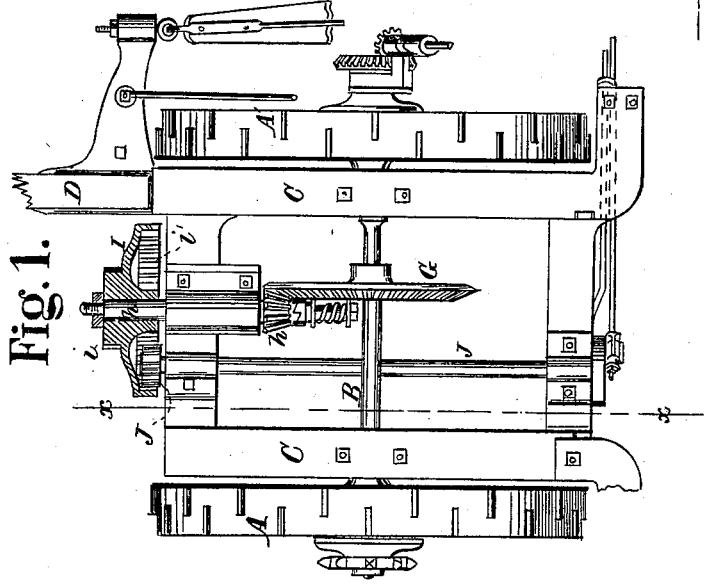

In the accompanying drawings, Figure 1 represents a plan or top view of so much of a harvester embracing the improvement herein claimed as is necessary to illustrate the invention; Fig. 2, a vertical longitudinal section through the same at the line $x\ x$ of Fig. 1, and Fig. 3 an end view of the reversible gear.

In this instance two driving-wheels, A A', turn loosely on an axle, B, with which they are connected by suitable backing-ratchets. A main frame, C, is mounted in proper bearings on the axle. The team is attached to a tongue, D, projecting from said frame. A finger-beam is suspended from the main frame by a drag-bar and coupling-arm of well-known construction, and is provided with the well-known Hussey cutting apparatus. A bevel-wheel, G, on the main axle drives a corresponding pinion, $h$, on a counter-shaft, $h'$, carrying on its front end a wheel, I, having an external spur-pinion, $i$, on one face, and an internal spur-wheel, $i'$, on the other. The wheel I is held on its shaft by a nut and screw, or equivalent fastening, so that it may be readily removed, reversed, and replaced.

The cutters are operated, in the usual way, by a crank and pitman driven by a crank-shaft, J, carrying a small spur-pinion, $j$. This pinion, it will be observed, is so arranged as to gear with whichever of the pinions $i\ i'$ is next to it. The internally-geared pinion $i'$, being larger than the other, of course drives the cutters more rapidly when in gear with the pinion.

It will thus be perceived that by my invention I am enabled to vary the speed of the cutters at will by reversing the pinion on its shaft, and thus to dispense with the clutch mechanism and double gears heretofore employed.

What I claim as my invention, and desire to secure by Letters Patent, is—

1. The combination, with the driving-gearing of a harvester, of a wheel having external teeth on one side and internal teeth on the other, whereby the speed of the cutters is varied simply by reversing the wheel on its shaft, as set forth.

2. The combination of the crank-shaft and its pinion with the counter-shaft and its reversible gear-wheel, all constructed to operate substantially as set forth.

In testimony whereof I have hereunto subscribed my name.

AMOS RANK.

Witnesses:
    THOS. S. BAIRD,
    CHAS. W. CADWALLADER.